United States Patent [19]
Allaer

[11] Patent Number: 5,769,006
[45] Date of Patent: Jun. 23, 1998

[54] SAFETY BOX

[75] Inventor: Dina Allaer, Hever, Belgium

[73] Assignee: Alcadi, Hever, Belgium

[21] Appl. No.: 448,480

[22] PCT Filed: Oct. 6, 1994

[86] PCT No.: PCT/BE94/00066

§ 371 Date: Aug. 17, 1995

§ 102(e) Date: Aug. 17, 1995

[87] PCT Pub. No.: WO95/10132

PCT Pub. Date: Apr. 13, 1995

[30] Foreign Application Priority Data

Oct. 6, 1993 [BE] Belgium ............................ 09301050

[51] Int. Cl.$^6$ ........................................................ E06B 3/34
[52] U.S. Cl. ......................... 109/73; 220/4.02; 220/3.3; 220/476; 70/159; 70/63; 109/51
[58] Field of Search ............................. 70/158, 159, 160, 70/161, 162, 163, 164, 63, 416; 109/50–52; 220/3.3, 3.8, 337, 4.02, 476; 312/245, 248; 248/475.1, 489

[56] References Cited

U.S. PATENT DOCUMENTS

| | | | |
|---|---|---|---|
| 1,758,361 | 5/1930 | Frost | 70/162 |
| 2,489,245 | 11/1949 | Sola | 220/3.8 |
| 2,656,948 | 10/1953 | McGee | 220/3.8 |
| 3,096,409 | 7/1963 | Hubbell et al. | 70/161 |
| 3,391,256 | 7/1968 | Nawman | 70/162 |
| 3,605,457 | 9/1971 | Foster | 70/14 |
| 3,672,190 | 6/1972 | Palazzolo | 70/14 |
| 4,258,632 | 3/1981 | LaPointe | 109/73 |
| 4,304,447 | 12/1981 | Ellwood et al. | 312/248 |
| 4,484,692 | 11/1984 | Palermo et al. | 220/3.8 |
| 4,548,330 | 10/1985 | Hewitt et al. | 109/70 |
| 4,712,157 | 12/1987 | Simonson et al. | 220/3.3 |
| 4,739,637 | 4/1988 | Finkel et al. | 70/58 |
| 4,805,073 | 2/1989 | Johnson et al. | . |
| 4,898,009 | 2/1990 | Lakoski et al. | 70/161 |
| 5,101,869 | 4/1992 | Myers | 70/164 |

FOREIGN PATENT DOCUMENTS

| | | | |
|---|---|---|---|
| 2642886 | 8/1990 | France | . |
| 415560 | 8/1934 | United Kingdom | 220/476 |
| 2153002 | 8/1985 | United Kingdom | 70/58 |

OTHER PUBLICATIONS

France. Brevet D'Invention. 1 501 742.

*Primary Examiner*—Darnell M. Boucher
*Attorney, Agent, or Firm*—Birch, Stewart, Kolasch & Birch, LLP

[57] ABSTRACT

The invention relates to a safety box which includes a bottom plate provided with devices for attaching the bottom plate to a wall or a partition, and with a box shaped cover hingedly connected to this bottom plate. The construction of the safety box according to the invention prevents unauthorized access to the interior of the safety box.

20 Claims, 2 Drawing Sheets

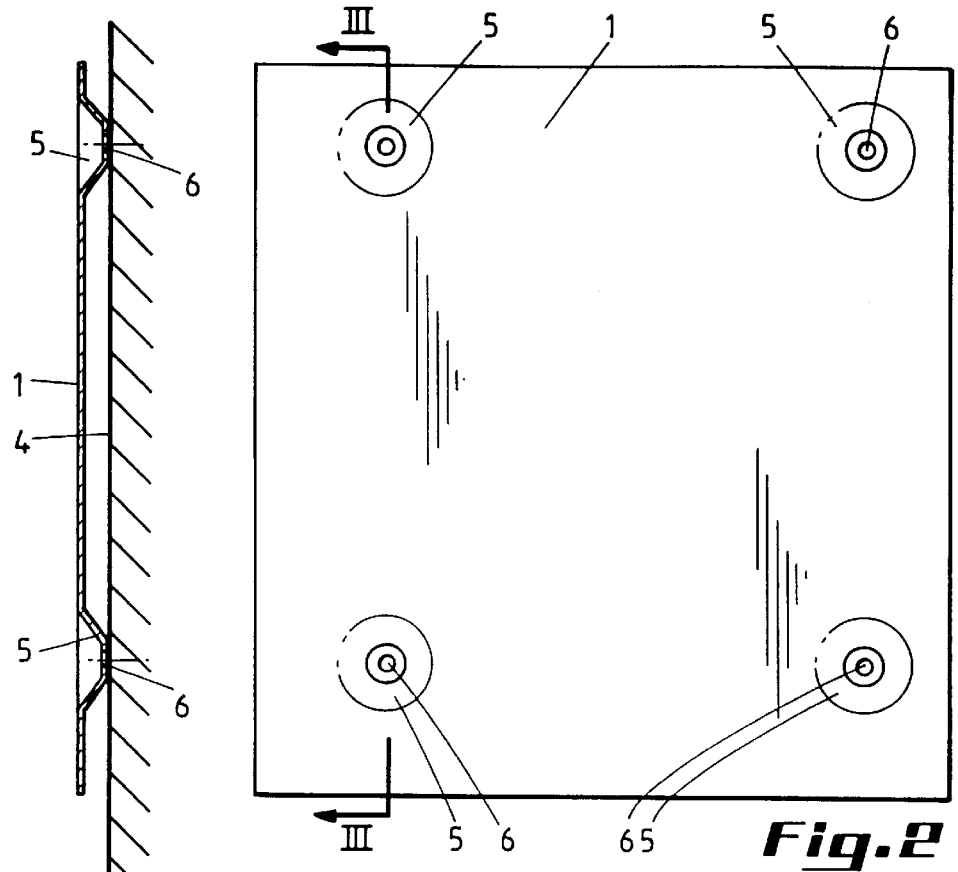
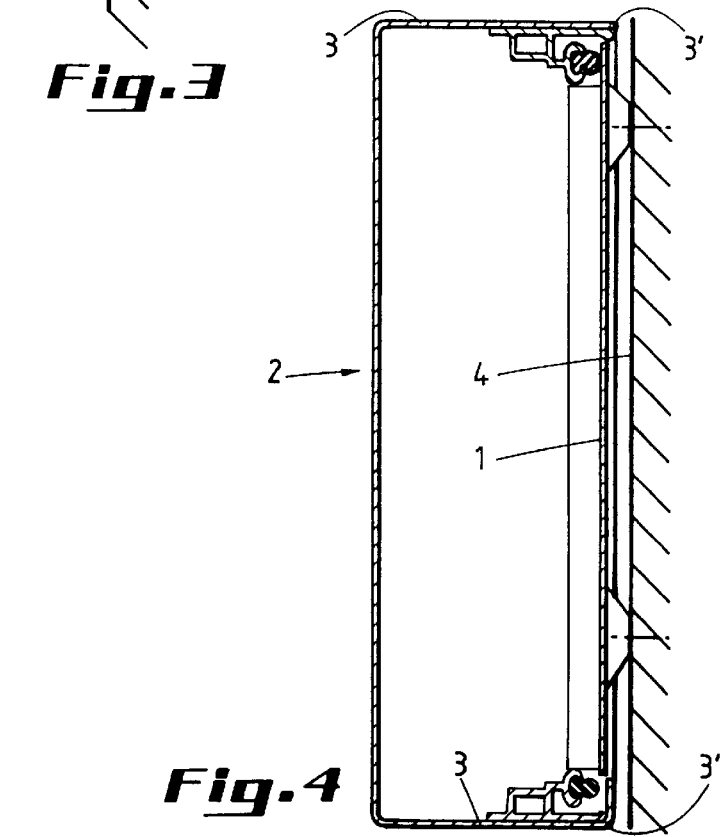
Fig.2
Fig.3
Fig.4

SAFETY BOX

This invention relates to a safety box.

SUMMARY OF THE INVENTION

The object of the invention is to provide a safety box being structured in such a way that each form of burglary is made impossible. The invention, in particular, makes the area of the box inaccessible where jimmies or the like could in normal conditions be introduced to break open the box.

To allow this, according to the invention, the safety box according to the invention consists of a bottom plate provided with means for attaching to a wall or partition and with a box shaped cover hingedly connected to this bottom plate.

The invention is characterised in that the dimensions of said bottom plate are chosen with respect to those of said box shaped cover in such a way that the bottom plate fits entirely within the box shaped cover in the closed position of the safety box.

In a preferably applied embodiment the edges of said box shaped cover project beyond the edges of said bottom plate in the closed position of the box.

Other details and advantages of the invention will become apparent from the following description of a safety box according to the invention. This description is only given by way of example and does not limit the invention. The reference numerals relate to the figures annexed hereto.

BRIEF DESCRIPTION OF THE DRAWINGS

FIG. 2 is a view of the rear side of the bottom plate of the safety box according to the invention.

FIG. 3 is a cross-section according to the line III—III from FIG. 2.

FIG. 4 shows, in cross-section, the relation to a wall or partition of the box shaped cover and of the bottom plate.

DETAILED DESCRIPTION OF THE PREFERRED EMBODIMENT

Figure 1:
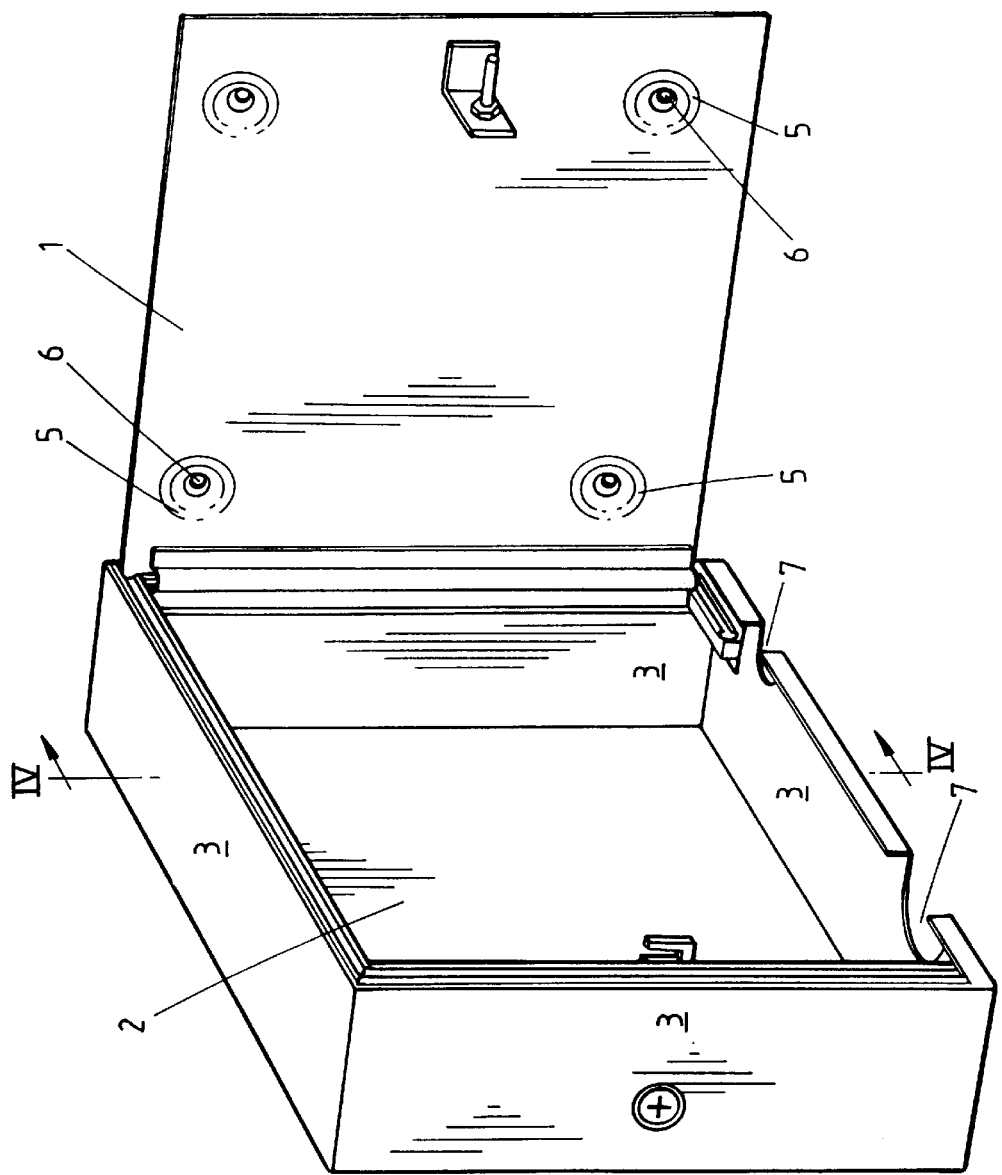
FIG. 1 is a perspective view of the safety box according to the invention.

The safety box shown by these figures can be used for a number of well determined purposes. One thereof for which the box is particularly suited is the protection of electrical infrastructure belonging to communication apparatuses, incoming distribution cables, connection cables, distribution points and connection points. In certain specific situations, the safety box according to the invention provides efficient protection of incoming telephone lines.

The safety box includes a bottom plate 1 arranged to be attached to a wall or partition, and which can be provided with the necessary means for receiving the electrical structures. These means and said structures have not been shown in the figures. It will also be clear that, whilst the case of a safety box for incoming cables is described here casually, the box according to the invention can have many other applications. The essence of the invention is in the means for making each form of burglary or fraudulent access impossible.

These means are formed by the combination of a bottom plate 1, which is to be attached to a wall or a partition, and a box shaped cover 2, hingedly connected to the bottom plate.

A remarkable characteristic of this original combination has to be seen in the fact that the edges 3' of the four walls 3 of the box shaped cover 2 always project beyond the bottom plate 1, in the closed position.

Thanks to this provision (represented by FIG. 4) it is in no way possible to introduce any pointed or sharp object, screwdriver or jimmy between the free edge of the bottom plate 1 and the edges 3' of the walls 3. Because the bottom plate 1 is provided for attachment to a wall or partition (represented by reference 4) with four bulges 5, through openings 6 of which screws or similar attaching means can be introduced, the bottom plate 1 of the safety box according to the invention is situated always at a larger distance from the wall or partition 4 than the free edge 3' of the walls 3 of the box shaped cover. This situation, which is a very characterising feature of the invention, is clearly represented by FIG. 4.

In the mounted position, the edges 3' of the walls 3 of the box shaped cover 2 always fit closely to a wall or partition, whereas the bottom plate 1 of the box is always situated on a certain distance therefrom. The gap between the inner side of the walls 3 and the circumferential edge of the bottom plate 1 is thus by no means, under no circumstances, accessible.

Thanks to this characterising structure of the safety box according to the invention, it can be considered as entirely protected against burglary or fraudulent access. A safety box of said type, with the characteristics described hereinabove, can therefore have many applications. One of these applications is storing electrical cables, telephone cables or telephone distribution cables, which are best introduced in the safety box by using slot shaped openings 7 which can be seen in FIG. 1. These slot shaped openings 7 are present in one of the walls 3 of the box shaped cover 2.

The invention is of course not limited to the embodiment described hereinabove and a lot of modifications could be applied thereto without leaving the scope of the patent application, provided these modifications fall within the scope of the claims annexed hereto.

I claim:

1. A safety box comprising:
    a substantially planar bottom plate having a plurality of side edges;
    a box-shaped cover connected to said bottom plate and movable between an open position and a closed position, said box-shaped cover including a top plate and a plurality of side walls extending from said top plate, one of said side walls including an inwardly turned lip directed toward one of said side edges of said bottom plate, said plurality of side walls forming an opening in said box-shaped cover which is approximately equal to dimensions of said bottom plate such that the bottom plate is adapted to pass closely through said opening and fit entirely within said box-shaped cover when in said closed position, a portion of each of said side walls projecting below said side edges of said bottom plate when in said closed position; and
    a hinge operatively connecting one of said side walls to said bottom plate, wherein one of said side walls includes a pair of spaced-apart openings therein.

2. The safety box according to claim 1, wherein said inwardly turned lip is spaced away from said top plate by a distance greater than a spacing between said top plate and said bottom plate when in said closed position.

3. The safety box according to claim 2, wherein said bottom plate includes a plurality of raised portions for spacing said bottom plate away from a supporting structure when said bottom plate is attached to said supporting structure.

4. The safety box according to claim 1, wherein said bottom plate includes a plurality of raised portions for spacing said bottom plate away from a supporting structure when said bottom plate is attached to said supporting structure.

5. A safety box comprising:

a substantially planar bottom plate having a plurality of side edges, said bottom plate including a plurality of raised portions for spacing said bottom plate away from a supporting structure when said bottom plate is attached to said supporting structure;

a box-shaped cover connected to said bottom plate and movable between an open position and a closed position, said box-shaped cover including a top plate and a plurality of side walls extending from said top plate, said plurality of side walls forming an opening in said box-shaped cover which is approximately equal to dimensions of said bottom plate such that the bottom plate is adapted to pass closely through said opening and fit entirely within said box-shaped cover when in said closed position, a portion of each of said side walls projecting below said side edges of said bottom plate when in said closed position, one of said side walls including an inwardly turned lip directed toward one of said side edges of said bottom plate, said inwardly turned lip being spaced between said top plate and said bottom plate when in said closed portion, said one of said side walls including a pair of spaced-apart openings therein; and a hinge operatively connecting a second one of said side walls to said bottom plate.

6. A safety box comprising:

a substantially planar bottom plate having a front surface, a rear surface, and a plurality of side edges;

a box-shaped cover connected to said bottom plate and swingably movable between an open position and a closed position, said box-shaped cover including a top plate and a plurality of side walls extending from said top plate, said plurality of side walls forming an opening in said box-shaped cover which is approximately equal to dimensions of said bottom plate such that the bottom plate is adapted to pass closely through said opening and fit within said box-shaped cover when in said closed position, a portion of each of said side walls projecting below said side edges of said bottom plate when in said closed position;

a hinge operatively connecting one of said side walls to said front surface of said bottom plate; and a plurality of raised portions located on said rear surface of said bottom plate for spacing said bottom plate away from a supporting structure.

7. The safety box according to claim 6, wherein one of said side walls includes an inwardly turned lip directed toward one of said side edges of said bottom plate.

8. The safety box according to claim 7, wherein said inwardly turned lip is spaced away from said top plate by a distance greater than a spacing between said top plate and said bottom plate when in said closed position.

9. The safety box according to claim 6, wherein one of said side walls includes a pair of spaced-apart openings therein.

10. The safety box according to claim 6, wherein said raised portions comprise substantially conical projections.

11. The safety box according to claim 6, wherein each of said conical projections is truncated.

12. The safety box according to claim 6, wherein said raised portions are located adjacent to each of four corners of the bottom plate.

13. The safety box according to claim 6, wherein each of said raised portions includes an aperture therein for receiving a fastener for attaching said bottom plate to said supporting structure.

14. The safety box according to claim 4, wherein said raised portions comprise substantially conical projections.

15. The safety box according to claim 14, wherein each of said conical projections is truncated.

16. The safety box according to claim 4, wherein said raised portions are located adjacent to each of four corners of the bottom plate.

17. The safety box according to claim 4, wherein each of said raised portions includes an aperture therein for receiving a fastener for attaching said bottom plate to said supporting structure.

18. The safety box according to claim 5, wherein said raised portions comprise substantially conical projections.

19. The safety box according to claim 18, wherein each of said conical projections is truncated.

20. The safety box according to claim 5, wherein each of said raised portions includes an aperture therein for receiving a fastener for attaching said bottom plate to said supporting structure.

* * * * *